Nov. 25, 1958 J. R. YOUNKIN 2,862,165
MODULATION-CONVERSION SWITCHED SERVO CONTROL
Filed Sept. 19, 1957 2 Sheets-Sheet 1

INVENTOR.
JAMES R. YOUNKIN
BY Moody and Goldman
ATTORNEYS

INVENTOR.
JAMES R. YOUNKIN
BY Moody and Goldman
ATTORNEYS

United States Patent Office 2,862,165
Patented Nov. 25, 1958

2,862,165

MODULATION-CONVERSION SWITCHED SERVO CONTROL

James R. Younkin, Garland, Tex., assignor to Collins Radio Company, Cedar Rapids, Iowa, a corporation of Iowa Application September 19, 1957, Serial No. 684,980

7 Claims. (Cl. 318—207)

Figure 1:
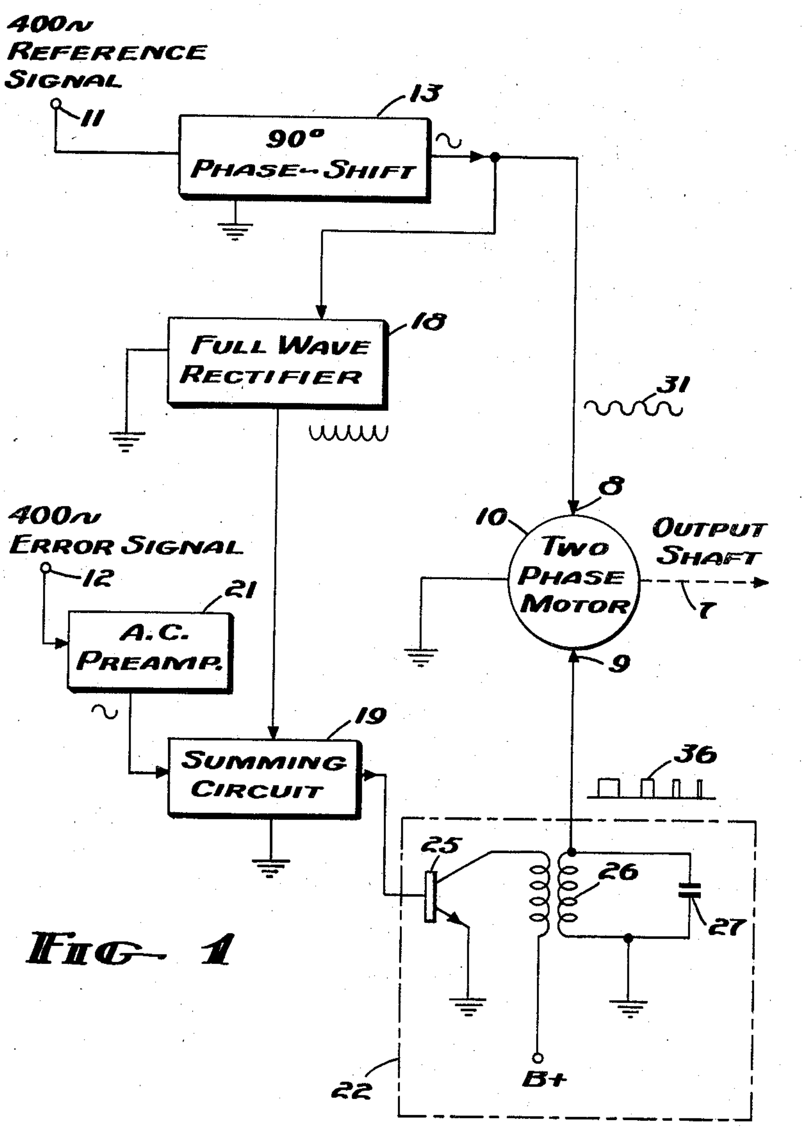

This invention relates generally to servo-output devices. It relates particularly to a servomotor control circuit utilizing a switched-power amplifier that is well suited to obtain maximum efficiency with transistors, although it can also utilize vacuum-tube switched amplifiers.

Servomechanisms utilizing two-phase motors are well-known, in which a reference signal is provided as one input and an error signal is supplied as the other motor input, with a 90° phase difference between them. In such conventional systems, various types of linear amplifiers have been utilized for the error signal in order to preserve its amplitude variations. However, due to the peculiar characteristics of transistors, they are very much limited in their power-handling capacity when operating linearly, due to moderately-high output impedances when so operated. Their power-handling characteristics are vastly increased, however, when operated non-linearly in a switched manner, by being switched between fully-open and fully-closed conditions. When fully closed, i. e. biased to maximum output-current flow, they provide a very low output impedance and can control as much as 50 times more power without overheating than when operated linearly.

The invention in effect provides simple means for translating the amplitude modulation of an A. C. error signal into pulse-width modulation, which operates an amplifier non-linearly while preserving the modulation. The pulse-width modulated signal directly operates the servomotor. Thus, when utilized as taught by the invention, a single transistor can handle an amount of power which previously required many linearly-operated transistors of the same type.

The invention receives an error signal, which is phase-shifted 90° with respect to a reference signal, and full-wave rectifies it, without any filtering in order to preserve the pulsed waveform of a fully rectified signal. Full-wave rectification can be done by conventional means, for example by phase-splitting and dual-diode rectifying, or by using a four diode ring rectifier. The full-wave rectified signal provides a sequence of pulses which have their peaks positioned at the respective peak and minimum points of the sine-wave type error signal. A summing circuit receives the error signal and rectified wave, and adds their amplitudes to provide a pulsed wave having alternate maximum and minimum peaks. The alternate maximum peaks are used to drive a transistor amplifier (or vacuum-tube amplifier) from cutoff into saturation (maximum output-current flow). Accordingly, the amplifier is switched on at the frequency of the error signal for periods that vary according to the amplitude of the error signal. Hence, the amplifier provides output pulses having about the same amplitude but having pulse-widths varying with the amplitude of the input error signal.

When a phase reversal of error signal occurs, the maximum and minimum pulse peaks of the summed wave are reversed in position with the previously minimum alternate pulses becoming maximum in amplitude, and vice versa. These pulses are 90° leading or lagging the phase of the reference-wave input to the motor, according to the two respective phases of the error signal. Hence, the rotational direction of the servomotor is controlled by the two respective phases of the error signal. Hence, the rotational direction of the servomotor is controlled by the two respective phases of the error signal.

Further objects, features and advantages of this invention will become apparent to a person skilled in the art upon further study of the specification and the accompanying drawings, in which:

Figure 1 represents a basic form of the invention; and

Figures 2(A)–(H) show wave-forms used in explaining the operation of the invention.

Now referring to the drawings for a detailed description of the invention, a two-phase motor 10 in Figure 1 provides the output of a servo system by means of its output shaft 7. Motor 10 has signal inputs 8 and 9 which require an approximate 90° phase relationship to drive the motor.

A terminal 11 receives a sine-wave reference signal (which might be 400 cycles-per-second) and which may be connected to the power source of the servo system. A terminal 12 receives the error signal of the servo system, which also has the same frequency, which may be 400 cycles-per-second, but which has either 0° or 180° phase with respect to the reference signal, depending upon the direction of rotation required for motor 10. A 90° phase-shift circuit 13 is connected between terminal 11 and input 8 of motor 10 to phase-shift the motor reference-signal input 8 by 90°.

The other motor input 9 receives a pulsed wave that has a repetition rate equal to the frequency of the reference signal, which is 400 pulses-per-second, wherein the fundamental frequency of the pulses is phased either 90° leading or 90° lagging the reference sine-wave (according to the rotational direction required for the motor), with the width of the pulses being a function of the amplitude of the error signal.

An alternating-current preamplifier 21 has its input connected to terminal 12 which receives the error signal. Preamplifier 21 may be a class A amplifier and provides a relatively small degree of amplification to keep the error signal above the noise level of the system.

A full-wave rectifier 18 receives the 90° phase-shifted reference signal by being connected to the output of circuit 13. Rectifier 18 may be any of several conventional types, and for example may have a phase-splitter followed by two diodes oppositely connected. However, rectifier 18 is not followed by any filter, as is conventionally done. Thus, the rectified wave has full ripple content and appears as the wave shown in Figure 2(B), which is the full-wave rectified form of the reference-signal wave shown in Figure 2(A).

The polarity of rectification required is dependent upon the type of transistor used in a following amplifier 22, which is discussed in more detail later. If it uses a single NPN transistor or vacuum tube, negative-polarity rectification is used. If it uses a single PNP transistor, then positive-polarity rectification is used.

Figures 2A, 2B, 2C, 2D, 2E, 2F, 2G, 2H:
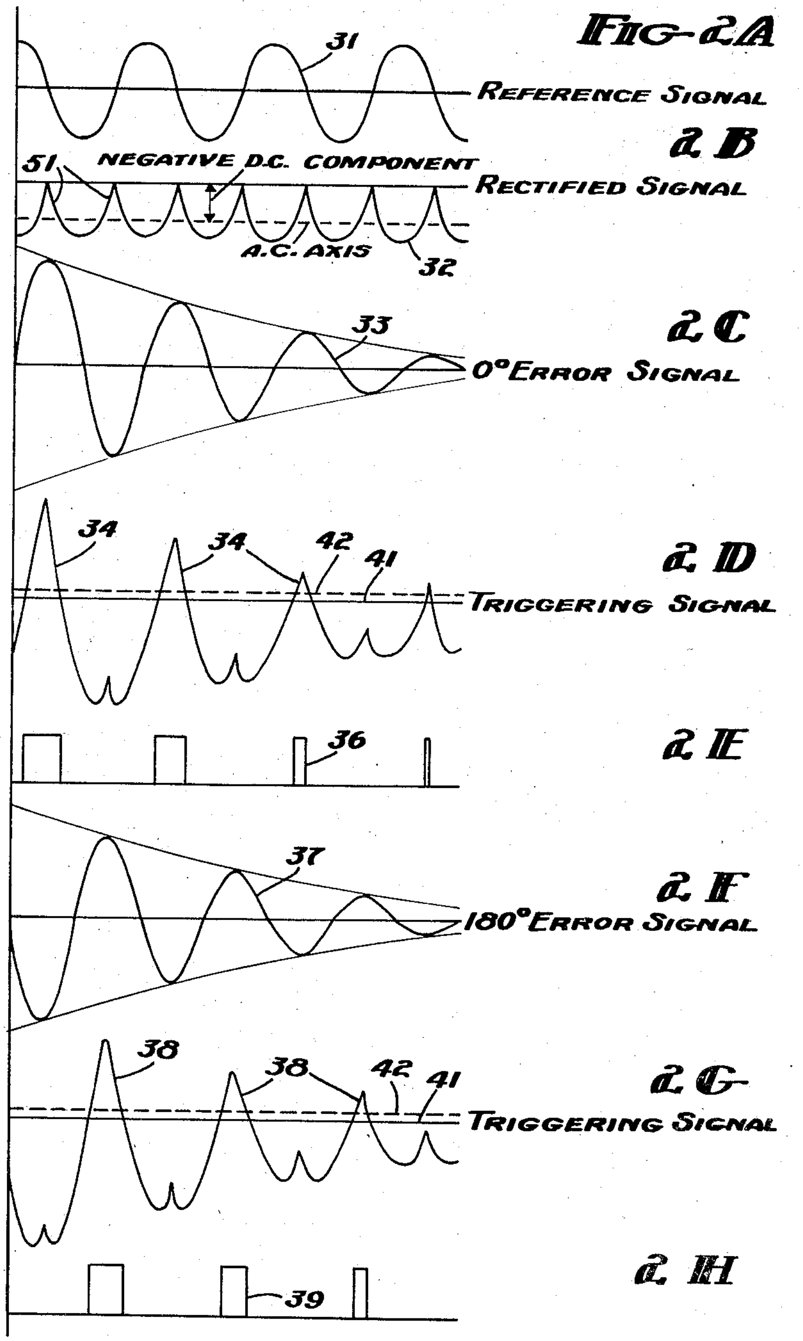

A summing circuit 19 adds the instantaneous amplitudes of the error signal and the fully-rectified wave. Hence, the inputs to circuit 19 are connected to the outputs of rectifier 18 and preamplifier 21. The time-occurrence of the rectified peaks 51 in Figure 2(B) is at maximum and minimum points of the error signal, because of the 90° phase relationship between the reference and error signals. Figure 2(C) shows an error signal having 0° phase with respect to the reference signal (before it was 90° phase-shifted). Figure 2(F) illustrates an error signal which has a phase of 180° with respect to the reference signal (before it was 90° phase-shifted). Note that the peaks of the rectified signal in Figure 2(B) occur at maximum and minimum points for each of the two phases of error signal in Figures 2(C) and 2(F). Thus, the pulse peaks of rectified wave 32 occur at 90° and 270° phase points of the error signal, whether the error signal has 0° or 180° phase.

The direct-current component obtained by rectification is preserved also. Thus, direct coupling can be provided between the output of rectifier 18 and the input to summing circuit 19.

Figure 2(D) illustrates the output of summing circuit 19 when receiving the 0° error signal 33 of Figure 2(C). Thus, the summing-circuit output in Figure 2(D) is the sum of the waves of Figures 2(B) and 2(C). Note the alternate maximization and minimization of the peaks of the rectified wave 34 due to the positive and negative half-cycles of the error signal.

A switched amplifier 22 in Figure 1 has a NPN transistor 25 connected as a conventional single-ended common emitter amplifier. Its base is connected to the output of summing circuit 19. The transistor is driven above cutoff into saturation by the peaks of the large alternate pulses of the summing-circuit output wave in Figure 2(D). Line 41 represents the transistor cutoff level, and line 42 represents the transistor saturation level. When the wave exceeds the saturation level, the transistor output has very low impedance and accordingly can handle relatively large amounts of current.

If the voltage peaks of the largest pulses are so high that they might damage the transistor, a conventional amplitude clipping circuit (not shown) can be provided at the output of summing circuit 19.

Due to the switching between cutoff and saturation, approximately constant-level output pulses are provided from switched amplifier 22. Its output is coupled through a transformer 26 to the input 9 of motor 10. A capacitor 27 is coupled across the secondary of transformer 26 to by-pass some of the high harmonic content of the pulsed wave to ground, since most two-phase motors do not require the harmonics. A sequence of transistor output pulses shown in Figure 2(E) is therefore provided which have their duration varied according to the instantaneous amplitude of the error signal (since the amplitude of the rectifier pulse is constant). The duration of each pulse is determined by the period of time that the switching pulses [see Figure 2(D)] exceed saturation level 42 of the transistor.

A higher output impedance is provided during the periods that the switching input pulses are between levels 41 and 42. However, the switching input pulses pass between these levels at a very rapid rate, and this impedance is made insignificant.

The switching signal illustrated in Figure 2(G) is the summation of the rectified pulses of Figure 2(B) and the 180° error signal 37 of Figure 2(F). Note that the alternate maximum peaks 38 of the switching signal in Figure 2(G) occur at the minimum peaks of the switching signal in Figure 2(C). There results the output pulses shown in Figure 2(H), due to the switching signal in Figure 2(G).

With respect to reference signal 31 in Figure 2(B), pulses 36 in Figure 2(E) are 90° leading and pulses 39 in Figure 2(H) are 90° lagging. Thus, a reversal in the phase of the error signal causes a reversal in the phase of pulsed input 9 of motor 10. This results in a reversal of the rotational direction of motor 10, hence permitting the phase of the error signal to have rotational control over the servo output.

When the error signal is zero, the negative direct-current component provided from rectifier 18 prevents its pulses from driving transistor 25 above cutoff. However, if the direct-current component is not preserved, sufficient bias can be provided with transistor 25 to prevent it being driven above cutoff during zero error signal conditions.

A vacuum tube amplifier can be used for amplifier 22, but vacuum tubes do not provide low output impedance upon saturation.

If a PNP transistor is used for amplifier 22, full-wave rectifier 18 should provide a positive-polarity output because of the reversed polarity requirements of PNP transistors compared to the NPN type.

Furthermore, circuit 22 could also be a fast-acting relay.

Although this invention has been described with respect to a particular embodiment thereof, it is not to be so limited as changes and modifications may be made therein which are within the full intended scope of the invention as defined by the appended claims.

I claim:

1. Means for converting an amplitude-modulated signal to a pulse-width modulated signal, comprising means providing a reference signal having the center-frequency of said amplitude-modulated signal, a full-wave rectifier receiving said reference signal and rectifying it, a summing circuit receiving said amplitude-modulated signal and the output of said rectifier and adding their instantaneous amplitudes, amplifier means receiving the output of said summing circuit, and said amplifier means being driven into saturation by the summing circuit output.

2. Means for converting an amplitude-modulated signal to a pulse-width modulated signal, comprising means providing a reference signal having the center frequency of said amplitude-modulated signal, means providing a 90° phase relationship between said reference signal and said amplitude-modulated signal, a full-wave rectifier receiving said reference signal and providing a rectified output having a ripple content, means for summing said amplitude-modulated signal and the output of said rectifier, amplifier means receiving the output of said summing means, said amplifier means being normally biased below cutoff, and said amplifier means being driven from below cutoff to saturation in a pulse manner by said summing means output.

3. Means for converting an amplitude-modulated signal to a pulse-width modulated signal, with said amplitude-modulated signal also being phase-modulated between opposite phase states, comprising means providing a reference signal having the center frequency of said amplitude-modulated signal, a phase-shifter for shifting the phase of said reference signal by 90° with respect to said amplitude-modulated signal, with the phase of said amplitude-modulated signal being either 90° leading or 90° lagging according to its respective phase modulation, a full-wave rectifier connected to the output of said phase-shifter for full-wave rectifying said phase-shifted reference signal, a summing circuit having one input connected to said full-wave rectifier output, and having its other input receiving said amplitude-modulated signal, said summing circuit adding together the amplitudes of said rectified signal and amplitude-modulated signal, the output of said summing circuit being a variable amplitude-pulsed wave, an amplifier receiving the output of said summing circuit and being driven between cutoff and saturation states by the pulsed output of said summing circuit, whereby a pulse-width modulated signal is provided from said amplifier output.

4. In a servomechanism system, comprising a two-phase motor having two inputs, a reference signal source, and an error signal source, both of said sources providing the same alternating frequency, with said error signal being amplitude-modulated, and phase-modulated to opposite phase conditions, a 90° phase-shift circuit connected between said reference signal source and one input of said motor, a full-wave rectifier circuit connected to the output of said phase-shift circuit to provide a ripple-containing output, a summing circuit for instantaneously adding a pair of signal inputs, with one input connected to said error signal source, and the other input connected to the output of said rectifier, a two-state switching device having its input connected to the output of said summing circuit, said switching device having a low-impedance state and a high-impedance state, said switching device providing a pulsed output in response to the summing circuit output, and the other input of said motor being connected to the output of said switching circuit.

5. A servomechanism output system portion, comprising a two-phase motor having first and second inputs, an alternating reference signal, and an alternating error signal, a 90° phase-shift circuit receiving said reference signal and having its output provided to one input of said motor, a full-wave rectifier connected to the output of said 90° phase-shift circuit to provide a ripple-containing output, a preamplifier receiving said error signal, a summing circuit for adding the currents received at a pair of inputs, with one input receiving the output of said preamplifier, and the other input of said summing circuit receiving the output of said rectifier, a transistor switching circuit, with its input connected to the output of said summing circuit, and the output of said switching circuit connected to the second input of said motor.

6. A servomechanism output system comprising a two-phase motor having first and second inputs, a reference signal source, a 90° phase-shift circuit connected between said source and the first input to said motor, a full-wave rectifier circuit connected to the output of said 90° phase-shift circuit to provide a ripple-containing output, a summing circuit for adding a pair of inputs, with one input received from said rectifier, an error signal source of said servomechanism providing an alternating error signal that is either 90° leading or lagging the output of said phase-shift circuit, a preamplifier connected between said error signal source and the other input to said summing circuit, a switching transistor amplifier having its input connected to the output of said summing circuit, a transformer coupling the output of said transistor switching amplifier to the second input of said motor.

7. A servomechanism output system portion, comprising a two-phase motor having first and second inputs, an alternating reference signal, and an alternating error signal, with opposite phases of said error signal representing required opposite directions of movement for said motor, means for providing a 90° phase relationship between said reference signal and said error signal, full-wave means for rectifying said reference signal to provide a ripple output, summing circuit means for adding said error signal to said ripple output signal, switching means being alternately actuated between high impedance and low impedance states by the output of said summing circuit, with one input of said motor being the output of said switching means, and the other input to said motor being said reference signal.

No references cited.